United States Patent
Seo et al.

(10) Patent No.: US 11,505,072 B2
(45) Date of Patent: Nov. 22, 2022

(54) REGENERATIVE BRAKING SYSTEM AND METHOD

(71) Applicants: HYUNDAI MOTOR COMPANY, Seoul (KR); KIA MOTORS CORPORATION, Seoul (KR)

(72) Inventors: Woo Pyeong Seo, Gwangmyeong-si (KR); Dong Hoon Kang, Suwon-si (KR); Eun Bae Koh, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 334 days.

(21) Appl. No.: 16/870,005

(22) Filed: May 8, 2020

(65) Prior Publication Data

US 2021/0122248 A1 Apr. 29, 2021

(30) Foreign Application Priority Data

Oct. 29, 2019 (KR) .......................... 10-2019-0135019

(51) Int. Cl.
*B60L 7/26* (2006.01)
*B60T 13/58* (2006.01)
(Continued)

(52) U.S. Cl.
CPC ................ *B60L 7/26* (2013.01); *B60T 8/172* (2013.01); *B60T 8/176* (2013.01); *B60T 13/586* (2013.01);
(Continued)

(58) Field of Classification Search
CPC .. B60L 15/2009; B60L 2220/42; B60L 50/61; B60L 7/18; B60L 7/26; B60T 1/10;
(Continued)

(56) References Cited

U.S. PATENT DOCUMENTS 5,632,534 A * 5/1997 Knechtges ............. B60T 13/74
303/3
6,086,166 A * 7/2000 Fukasawa ........... B60T 8/17636
303/122.04
(Continued)

FOREIGN PATENT DOCUMENTS

JP  2015002583 A  1/2015
KR 20090043126 A  5/2009
(Continued)

*Primary Examiner* — Tyler J Lee
(74) *Attorney, Agent, or Firm* — Lempia Summerfield Katz LLC

(57) ABSTRACT

A regenerative braking system and method include: a regenerative braking determination unit configured to determine whether or not a vehicle satisfies an entry condition for regenerative braking based on information collected by the vehicle; a calculation unit configured to calculate a hydraulic braking torque according to a pressure of a master cylinder and a target amount of a regenerative braking torque varied according to the pressure of the master cylinder, if the vehicle satisfies the entry condition; and a controller configured to perform braking of the vehicle based on the target amount of the regenerative braking torque and the hydraulic braking torque.

19 Claims, 7 Drawing Sheets

(51) Int. Cl.
  *B60T 8/17* (2006.01)
  *B60T 8/172* (2006.01)
  *B60T 8/176* (2006.01)
(52) U.S. Cl.
  CPC ....... *B60T 2250/00* (2013.01); *B60T 2250/04* (2013.01); *B60T 2270/10* (2013.01); *B60T 2270/602* (2013.01); *B60T 2270/604* (2013.01)
(58) Field of Classification Search
  CPC .. B60T 13/586; B60T 13/662; B60T 2250/00; B60T 2250/04; B60T 2270/10; B60T 2270/602; B60T 2270/604; B60T 7/042; B60T 8/172; B60T 8/176; B60Y 2200/91; F16D 61/00; Y02T 10/62; Y02T 10/64; Y02T 10/70; Y02T 10/72
  See application file for complete search history.

(56) References Cited

U.S. PATENT DOCUMENTS

| | | | | |
|---|---|---|---|---|
| 6,412,882 | B1* | 7/2002 | Isono | B60T 8/367 903/952 |
| 7,133,602 | B2* | 11/2006 | Yamada | B60L 58/12 318/815 |
| 7,426,975 | B2* | 9/2008 | Toyota | B60L 7/26 180/170 |
| 8,608,256 | B2* | 12/2013 | Park | B60T 13/586 303/3 |
| 9,415,692 | B2* | 8/2016 | Kato | B60T 8/24 |
| 2004/0054450 | A1* | 3/2004 | Nakamura | B60T 8/00 701/22 |
| 2006/0055240 | A1* | 3/2006 | Toyota | B60K 6/365 303/152 |
| 2006/0196712 | A1* | 9/2006 | Toyota | B60L 3/108 180/165 |
| 2007/0126382 | A1* | 6/2007 | Kang | B60L 7/24 318/376 |
| 2011/0049969 | A1* | 3/2011 | Park | B60L 7/12 303/3 |
| 2017/0096070 | A1 | 4/2017 | Hyun | |
| 2018/0134276 | A1 | 5/2018 | Zhao | |
| 2018/0215385 | A1* | 8/2018 | Huh | B60W 40/107 |

FOREIGN PATENT DOCUMENTS

| | | |
|---|---|---|
| KR | 20160053208 A | 5/2016 |
| KR | 20180123258 A | 11/2018 |

* cited by examiner

REGENERATIVE BRAKING SYSTEM AND METHOD

CROSS-REFERENCE TO RELATED APPLICATION

This application claims under 35 U.S.C. § 119(a) the benefit of priority to Korean Patent Application No. 10-2019-0135019 filed on Oct. 29, 2019, the entire contents of which are incorporated herein by reference.

BACKGROUND

(a) Technical Field

The present disclosure relates to a regenerative braking system and method which simultaneously perform hydraulic braking and regenerative braking.

(b) Background Art

In eco-friendly vehicles, regenerative braking, in which a battery is charged by electrical energy recovered from kinetic energy of a vehicle through power generation of an electric motor, is performed during braking. Eco-friendly vehicles include, for example, a hybrid electric vehicle (HEV) and an electric vehicle (EV), which are driven using an electric motor as a driving source, and a fuel cell electric vehicle (FCEV). In addition to regenerative braking, hydraulic braking, which is caused by operation of a brake by a user, and regenerative braking, which is caused by a coast regenerative torque which occurs during coasting, may be performed.

When a driver requested braking force, i.e., a target braking force, is calculated based on a brake signal corresponding to driver brake operation (driver braking input), for example, a signal of a brake pedal sensor (BPS) according to brake pedal operation, distribution between a regenerative braking force and a hydraulic braking force (frictional braking force), which satisfy the target braking force, is carried out. Further, when the regenerative braking force (a regenerative braking torque) and the hydraulic braking force are determined through such braking force distribution, control of the regenerative braking of a motor and control of a hydraulic braking apparatus are performed so as to produce the respective distributed braking forces.

However, conventionally, there was a regenerative braking system which performs only hydraulic braking and braking caused by a coast regenerative torque. In this case, a braking force caused by the coast regenerative torque is uniformly maintained and thus linearity in braking and pedal effort may be maintained, but a regenerative braking amount/force is small. Such a system lowers fuel efficiency of the vehicle.

Further, there was a regenerative braking system which performs regenerative braking through distribution between a regenerative braking force and a hydraulic braking force (frictional braking force) in addition to braking caused by a coast regenerative torque. In this case, in cooperative control between the regenerative braking force and the hydraulic braking force, a hydraulic force is increased or decreased, and thus, linearity in braking is not assured and pedal effort is not maintained.

SUMMARY OF THE DISCLOSURE

The present disclosure has been made in an effort to solve the above-described problems associated with the prior art and it is an object of the present disclosure to provide a regenerative braking system and method which may improve fuel efficiency of a vehicle and maintain the effort of a brake pedal.

It is another object of the present disclosure to provide a regenerative braking system and method which may increase a total braking quantity of a vehicle by maintaining the hydraulic pressure of a master cylinder even in regenerative braking.

It is yet another object of the present disclosure to provide a regenerative braking system and method which may reduce an amount of a brake used by a driver and improve fuel efficiency performance of a vehicle by calculating a target amount of a regenerative braking torque for performing additional regenerative braking depending on the pressure of a master cylinder.

In one aspect, the present disclosure provides a regenerative braking system including a regenerative braking determination unit configured to determine whether or not a vehicle satisfies an entry condition for regenerative braking based on information collected by the vehicle. The system further includes a calculation unit configured to calculate a hydraulic braking torque according to a pressure of a master cylinder and a target amount of a regenerative braking torque varied according to the pressure of the master cylinder, if the vehicle satisfies the entry condition for regenerative braking. The system further includes a controller configured to perform braking of the vehicle based on the target amount of the regenerative braking torque and the hydraulic braking torque.

In another embodiment, the braking of the vehicle may be performed based on a coast regenerative torque generated from a motor at a moment when tip-out caused by release of an accelerator pedal of the vehicle occurs.

In another embodiment, a deceleration of the vehicle may be generated by a sum of a total braking force and the coast regenerative torque, and the total braking force may be defined by a sum of the target amount of the regenerative braking torque and the hydraulic braking torque.

In still another embodiment, the information collected by the vehicle may include at least one of an anti-lock braking system (ABS) state signal, a traction control system (TCS) state signal, a vehicle dynamic control (VDC) state signal, a vehicle speed, a wheel speed, a gear state, or the pressure of the master cylinder.

In yet another embodiment, the entry condition for regenerative braking may include a case in which the pressure of the master cylinder is sensed, and the regenerative braking determination unit may determine that the vehicle does not satisfy the entry condition for regenerative braking, if slip of the vehicle occurs, a gear is in neutral, a defect of a motor of the vehicle is sensed, or a defect of an ABS of the vehicle is sensed.

In still yet another embodiment, the target amount of the regenerative braking torque may be calculated using an upper limit of the regenerative braking torque calculated by the controller, a coast regenerative torque when an accelerator pedal of the vehicle is released, and the pressure of the master cylinder.

In a further embodiment, the calculation unit may monitor the coast regenerative torque in real time so as to calculate the target amount of the regenerative braking torque.

In another further embodiment, the calculation unit may set a difference between the upper limit of the regenerative braking torque and the coast regenerative torque as an allowable regenerative braking torque. The calculation unit may compare a target amount of a pre-regenerative braking torque, calculated according to the pressure of the master cylinder, with the allowable regenerative braking torque. The calculation unit may set the allowable regenerative braking torque as the target amount of the regenerative braking torque when the target amount of the pre-regenerative braking torque is greater than the allowable regenerative braking torque.

In still another further embodiment, the calculation unit may set a plurality of pressure sections of the master cylinder and may set the target amount of the regenerative braking torque based on whether the pressure of the master cylinder is within any one of the pressure sections.

In yet another further embodiment, the calculation unit may set the target amount of the pre-regenerative braking torque as a value acquired by multiplying the pressure of the master cylinder by a conversion rate, if the pressure of the master cylinder is less than a first reference pressure. The calculation unit may set the target amount of the pre-regenerative braking torque as a value acquired by multiplying the first reference pressure by the conversion rate, if the pressure of the master cylinder is the first reference pressure or more and less than a second reference pressure.

In still yet another further embodiment, when the vehicle enters a low speed region, the calculation unit may calculate a change in the target amount of the regenerative braking torque so that the target amount of the regenerative braking torque becomes 0 when a speed of the vehicle reaches a lower threshold from an upper threshold of the low speed region. The controller may perform regenerative braking of the vehicle according to the change in the target amount of the regenerative braking torque calculated by the calculation unit.

In a still further embodiment, the calculation unit may set the target amount of the regenerative braking torque as 0, if the pressure of the master cylinder is a second reference pressure or more.

In a yet still further embodiment, the controller may maintain a hydraulic pressure caused by the pressure of the master cylinder, even if braking of the vehicle according to the target amount of the regenerative braking torque is performed.

In another aspect, the present disclosure provides a regenerative braking method including decelerating, by a controller, a vehicle based on a coast regenerative torque generated from a motor at a moment when tip-out caused by release of an accelerator pedal of the vehicle occurs. The method further includes determining, by a regenerative braking determination unit, whether or not the vehicle satisfies an entry condition for regenerative braking based on information collected by the vehicle. The method further includes calculating, by a calculation unit, hydraulic braking torque according to a pressure of a master cylinder and a target amount of a regenerative braking torque varied according to the pressure of the master cylinder, if the vehicle satisfies the entry condition. The method further includes performing, by the controller, braking of the vehicle based on the target amount of the regenerative braking torque and the hydraulic braking torque.

In another embodiment, the determination as to whether or not the vehicle satisfies the entry condition for regenerative braking may include determining that the vehicle does not satisfy the entry condition, if slip of the vehicle occurs, a gear is in neutral, or a defect of the motor of the vehicle is sensed.

In another embodiment, the calculation of the target amount of the regenerative braking torque may include determining an upper limit of the regenerative braking torque based on a torque output from the motor. The calculation may further include setting a difference between the upper limit of the regenerative braking torque and the coast regenerative torque as an allowable regenerative braking torque. The calculation may further include comparing a target amount of a pre-regenerative braking torque, calculated according to the pressure of the master cylinder, with the allowable regenerative braking torque. The calculation may further include setting the allowable regenerative braking torque as the target amount of the regenerative braking torque when the target amount of the pre-regenerative braking torque is greater than the allowable regenerative braking torque.

In still another embodiment, the calculation of the target amount of the regenerative braking torque may further include setting the target amount of the pre-regenerative braking torque as a value acquired by multiplying the pressure of the master cylinder by a conversion rate, if the pressure of the master cylinder is less than a first reference pressure.

In yet another embodiment, the calculation of the target amount of the regenerative braking torque may include, when the vehicle enters a low speed region during regenerative braking of the vehicle, calculating a change in the target amount of the regenerative braking torque so that the target amount of the regenerative braking torque becomes 0 until a speed of the vehicle reaches a lower threshold from an upper threshold of the low speed region.

In still yet another embodiment, the calculation of the target amount of the regenerative braking torque may further include setting the target amount of the pre-regenerative braking torque as a value acquired by multiplying a first reference pressure by a conversion rate, if the pressure of the master cylinder is the first reference pressure or more and less than a second reference pressure.

In a further embodiment, the calculation of the target amount of the regenerative braking torque may further include setting, by the calculation unit, the target amount of the regenerative braking torque as 0, if the pressure of the master cylinder is the second reference pressure or more.

Other aspects and embodiments of the present disclosure are discussed below.

The above and other features of the present disclosure are discussed below.

BRIEF DESCRIPTION OF THE DRAWINGS

The above and other features of the present disclosure are now described in detail with reference to specific embodiments thereof illustrated in the accompanying drawings which are given hereinbelow by way of illustration only, and thus do not limit the present disclosure, and wherein.

Figure 1:
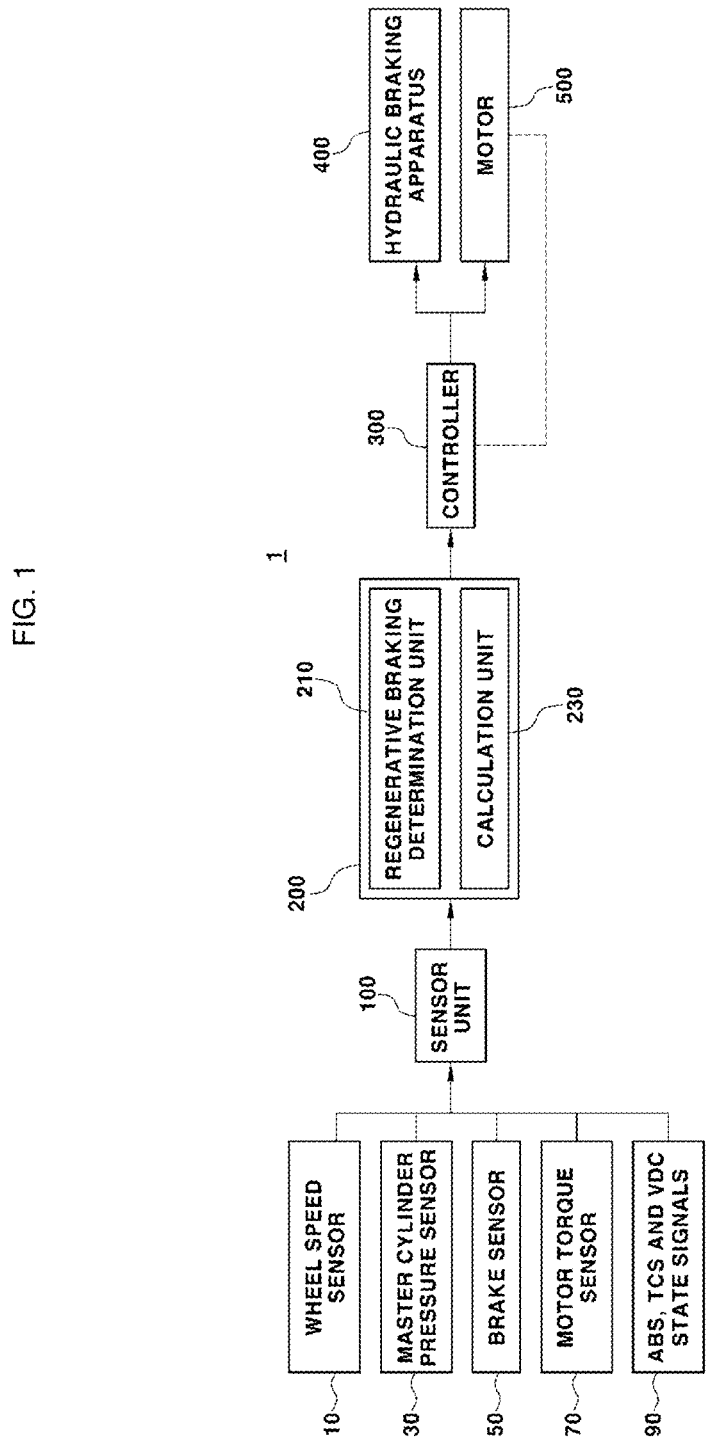
FIG. 1 is a block diagram illustrating a regenerative braking system in accordance with one embodiment of the present disclosure.

It should be understood that the appended drawings are not necessarily to scale and present a somewhat simplified representation of various features to present or illustrate the basic principles of the present disclosure. The specific design features of the present disclosure as disclosed herein, including, for example, specific dimensions, orientations, locations, and shapes should be determined in part by the particular intended application and use environment.

In the figures, the same reference numbers refer to the same or equivalent parts of the present disclosure throughout the several figures of the drawing.

DETAILED DESCRIPTION

Hereinafter, reference is made in detail to various embodiments of the present disclosure, examples of which are illustrated in the accompanying drawings and described below. While the present disclosure is described in conjunction with specific embodiments, it should be understood that the present description is not intended to limit the present disclosure to the specific embodiments. On the contrary, the present disclosure is intended to cover not only the specific embodiments, but also various alternatives, modifications, equivalents and other embodiments within the spirit and scope of the present disclosure as defined by the appended claims. In the following description of the present disclosure, the same or similar elements are denoted by the same reference numerals even though they are depicted in different drawings.

In the following description of the present disclosure, terms, such as " . . . part", " . . . unit", " . . . module", etc., mean units to process at least one function or operation, and these may be implemented by hardware, software or a combination of hardware and software. When a component, device, or element of the present disclosure, such as " . . . part", " . . . unit", " . . . module", and the like, is described as having a purpose or performing an operation, function, or the like, the component, device, or element should be considered herein as being "configured to" meet that purpose or to perform that operation, function, or the like. Further, a controller described herein may include a processor programmed to perform the noted operation, function, operation, or the like.

The following description of the present disclosure serves only to describe the present disclosure by way of example. Further, the following description of the present disclosure serves to describe specific embodiments of the present disclosure, and the present disclosure may be implemented in various different combinations, modifications, and environments. In other words, the following description of the present disclosure may be changed or modified within the scope of the present disclosure disclosed herein, a scope equivalent to the present disclosure, and/or the scope of technology or knowledge in the art to which the present disclosure pertains.

These embodiments are intended to describe the best mode to implement the technical spirit of the present disclosure and may be variously modified in terms of applications and purposes. Therefore, in the following description of the present disclosure, the specific embodiments are not intended to limit the present disclosure. Further, the appended claims should be interpreted as including other embodiments.

FIG. 1 is a block diagram illustrating a regenerative braking system in accordance with one embodiment of the present disclosure.

Referring to FIG. 1, a regenerative braking system 1 may include a sensor unit 100, an electronic posture controller 200 and a controller 300. The electronic posture controller 200 and the controller 300 may be components which perform one function of an electronic control unit (ECU) installed in a vehicle. The regenerative braking system 1 may be a system which is applied to a vehicle using a general hydraulic master booster and electronic stability control (ESC). In other words, the regenerative braking system 1 in accordance with one embodiment of the present disclosure may be a system for regenerative braking which is not equipped with a pedal simulator. The regenerative braking system 1 may simultaneously perform hydraulic braking and regenerative braking. In general, ESC which is applied to conventional technologies determines a distribution ratio between a braking force caused by hydraulic pressure and a braking force caused by regenerative braking based on a total braking force. However, the regenerative braking system 1 in accordance with one embodiment of the present disclosure may calculate a braking force caused by hydraulic pressure and a braking force caused by regenerative braking respectively, and then calculate a total braking force by summing the same. Therefore, the total braking force calculated by the regenerative braking system 1 in accordance with the present disclosure may be greater than the total braking force calculated by the general ESC applied to conventional technologies.

The sensor unit 100 may collect and measure various pieces of information generated in the vehicle (state information of the vehicle). The information collected by the vehicle may include at least one of an anti-lock braking system (ABS) state signal, a traction control system (TCS) state signal, a vehicle dynamic control (VDC) state signal, a vehicle speed, a wheel speed, a gear state, or a pressure of a master cylinder. The sensor unit 100 may include wheel speed sensors 10, a master cylinder pressure sensor 30, a brake sensor 50 and a motor torque sensor 70. In addition, the sensor unit 100 may further include a sensor which senses the state of a gear, a sensor which senses the deceleration of the vehicle, a sensor which senses a regenerative braking torque, etc. Further, the sensor unit 100 may receive the ABS state signal, the TCS state signal and the VDC state signal (i.e. the signals 90). The information sensed by the sensor unit 100 may be transmitted to the electronic posture controller 200.

The wheel speed sensor 10 may estimate the speed of the vehicle by measuring the speed of a wheel of the vehicle. The wheel speed sensor 10 may be installed at each wheel of the vehicle. The wheel speed sensor 10 may transmit the sensed vehicle speed to the electronic posture controller 200.

The master cylinder pressure sensor 30 may be installed at the master cylinder which is one component of a hydraulic braking apparatus 400 installed in the vehicle. The master cylinder may mean a hydraulic cylinder which converts mechanical force generated, when a brake pedal is depressed, into hydraulic force. The master cylinder pressure sensor 30 may measure hydraulic pressure, and the hydraulic pressure of the master cylinder may be a parameter indicating the braking force of the vehicle caused by the hydraulic pressure. The master cylinder pressure sensor 30 may transmit the pressure of the master cylinder to the electronic posture controller 200.

The brake sensor 50 may sense a brake pedal stroke (the position of the brake pedal). In other words, the brake sensor 50 may sense a driver's braking intention. The brake sensor 50 may be a brake pedal position sensor (BPS). The brake sensor 50 may transmit sensed information indicating whether or not a driver depresses the brake pedal to the electronic posture controller 200.

The motor torque sensor 70 may sense a torque generated from a motor 500. The motor torque sensor 70 may transmit the sensed torque of the motor 500 to the electronic posture controller 200.

The electronic posture controller 200 may calculate a total target amount of braking force of the vehicle based on the information transmitted by the sensor unit 100. The total target amount of the braking force of the vehicle may mean the sum of the braking force caused by hydraulic pressure and the braking force caused by regenerative braking. In other words, the total target amount of the braking force of the vehicle may mean the sum of a target amount of a regenerative braking torque and hydraulic braking torque. The electronic posture controller 200 may include a regenerative braking determination unit 210 and a calculation unit 230. The regenerative braking determination unit 210 and the calculation unit 230 may be components which are classified depending on the functions of the electronic posture controller 200, and the electronic posture controller 200 may mean an electronic stability control (ESC) system. The electronic posture controller 200 may receive the ABS state signal, the TCS state signal and the VDC state signal from the sensor unit 100. Differently from the above description, the electronic posture controller 200 may directly receive information regarding the state of the vehicle from the ABS, the TCS, and the VDC systems. The ABS is a system which, if slip of the vehicle occurs, controls the pressure of the brake so as to prevent slip of the vehicle, or if the vehicle is suddenly braked, prevents locking of the wheels. The TCS is a system which controls the driving force of the vehicle so as to prevent idling of the wheels caused by an excessive driving force generated when the vehicle is started or accelerated on a slippery road. The VDC system is a system which controls the pressures of respective wheel brakes and engine output by sensing slip of the vehicle even if a driver separately applies braking to the vehicle. The information regarding the state of the vehicle may include information regarding whether or not slip of the vehicle occurs. In other words, the ABS, the TCS, and the VDC systems may sense whether or not slip of the vehicle occurs and may transmit information regarding slip of the vehicle to the electronic posture controller 200 if slip of the vehicle occurs.

The regenerative braking determination unit 210 may determine whether or not the vehicle satisfies an entry condition for regenerative braking based on the information collected by the vehicle. The entry condition may mean a case in which the pressure of the master cylinder is sensed. In general, from the moment when the driver depresses the brake pedal, regenerative braking of the vehicle may be performed. However, the regenerative braking determination unit 210 may determine that the vehicle does not satisfy the entry condition, if slip of the vehicle occurs, a gear is in neutral, a defect of the motor 500 of the vehicle is sensed, or a defect of the ABS of the vehicle is sensed. Whether or not slip of the vehicle occurs may be determined based on the information transmitted from the ABS, the TCS and the VDC system. Whether or not the gear is in neutral, whether or not the ABS of the vehicle is defective, and whether or not the motor 500 of the vehicle is defective may be determined based on the information sensed by the sensor unit 100.

The calculation unit 230 may calculate a target amount of a regenerative braking torque which is varied according to the pressure of the master cylinder. The target amount of the regenerative braking torque may mean a torque value for controlling the motor 500 so as to generate a target braking force caused by regenerative braking. The pressure of the master cylinder may be a parameter indicating a driver's braking intention, and the target amount of the regenerative braking torque may be varied according to the pressure of the master cylinder. For example, as the pressure of the master cylinder is increased, the target amount of the regenerative braking torque may be decreased. However, the calculation unit 230 does not calculate a total braking force according to the pressure of the master cylinder. The calculation unit 230 may calculate the target amount of the regenerative braking torque according to the pressure of the master cylinder. Therefore, the regenerative braking system 1 may generate a regenerative braking force in addition to a hydraulic braking force according to the pressure of the master cylinder, thereby braking the vehicle. The target amount of the regenerative braking torque may be calculated using an upper limit of the regenerative braking torque which is described below, a coast regenerative torque when an accelerator pedal of the vehicle is released (tip-out) and the pressure of the master cylinder.

The controller 300 may perform braking of the vehicle based on the target amount of the regenerative braking torque and hydraulic braking torque according to the pressure of the master cylinder. For example, the controller 300 may include a vehicle control unit (VCU). The controller 300 may control the motor 500 according to the regenerative braking torque may and control the hydraulic braking apparatus 400 based on the hydraulic braking torque. In more detail, the controller 300 may control the motor 500 so as to perform regenerative braking by operating an inverter (not shown) connected to the motor 500 based on the target amount of the regenerative braking torque. Further, the controller 300 may control hydraulic pressure distributed to brakes of the respective wheels by controlling a hydraulic unit which is one component of the hydraulic braking apparatus 400, based on the hydraulic braking torque.

Further, the controller 300 may calculate the coast regenerative torque based on a vehicle speed when the accelerator pedal is released (tip-out). The coast regenerative torque may mean a torque applied to a drive shaft during coasting, and the coasting may mean continuation of driving of the vehicle due to inertia without outputting driving force (i.e., in a state in which the accelerator pedal or the brake pedal is turned off). In general, as the vehicle speed is increased, the coast regenerative torque may be set to be increased, and the coast regenerative torque according to the vehicle speed may be calculated based on a predetermined table. The coast regenerative torque during tip-out of the accelerator pedal may be detected through real-time monitoring of a controller area network signal (CAN signal). The calculation unit 230 may monitor the coast regenerative torque in real time so as to calculate the target amount of the regenerative braking torque. In other words, the calculation unit 230 may sense a coast regenerative torque during a process for calculating a target amount of a regenerative braking torque, and then sense a new coast regenerative torque during a process for again calculating a target amount of a regenerative braking torque. The controller 300 may detect the coast regenerative torque in real time may and calculate an allowable regenerative braking torque based on the coast regenerative torque. The allowable regenerative braking torque is described later.

In accordance with one embodiment of the present disclosure, the regenerative braking system 1 may simultaneously perform hydraulic braking and regenerative braking. In other words, the regenerative braking system 1 may maintain hydraulic pressure depending on the pressure of the master cylinder even if braking of the vehicle according to the target amount of the regenerative braking torque is performed. The conventional regenerative braking system equipped with ESC determines a distribution ratio between a braking force caused by hydraulic pressure and a braking force caused by regenerative braking based on a total braking force. The conventional regenerative braking system increases or decreases hydraulic pressure in cooperative control between the regenerative braking force and the hydraulic braking force. Therefore, the total braking force of the vehicle is decreased or suddenly increased according to a change in the hydraulic pressure. However, the regenerative braking system 1 in accordance with one embodiment of the present disclosure may calculate a braking force caused by hydraulic pressure and a braking force caused by regenerative braking respectively and then calculate a total braking force by adding the same. The regenerative braking system 1 may relatively uniformly calculate the total braking force of the vehicle by maintaining the hydraulic pressure. Therefore, the total braking force calculated by the regenerative braking system 1 in accordance with the present disclosure may be greater than the total braking force calculated by the general regenerative braking system equipped with ESC.

Further, the regenerative braking system 1 in accordance with one embodiment of the present disclosure may perform regenerative braking without any durability problems even if a low-price ESC model is applied thereto, and thus cost to implement the corresponding regenerative braking system 1 may be reduced. Further, the regenerative braking system 1 maintains the hydraulic pressure of the master cylinder during regenerative braking, and thus does not cause problems, such as turning-off of a pedal or difficulty in maintaining linearity in braking.

Figure 2:
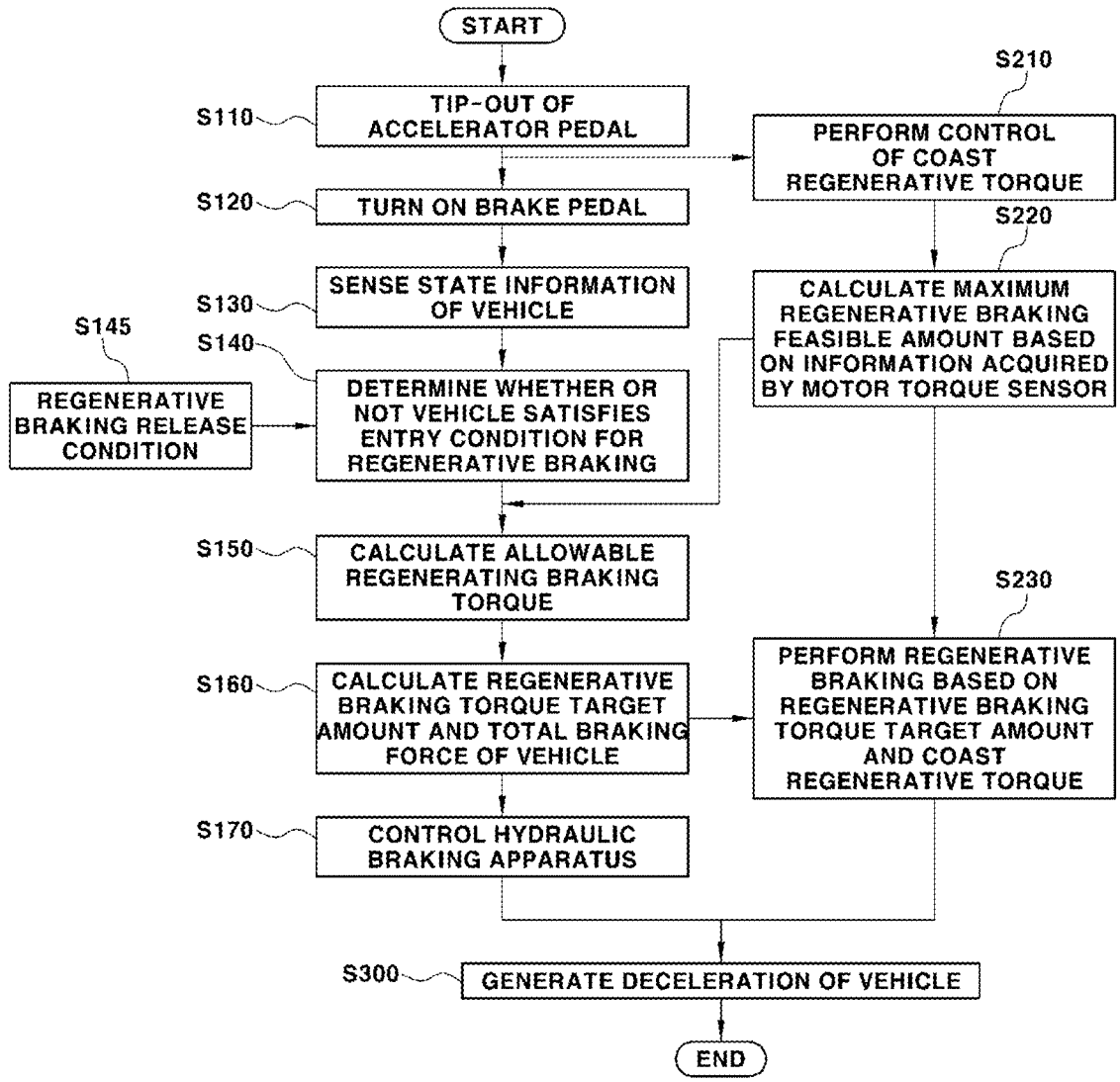
FIG. 2 is a flowchart representing a regenerative braking method in accordance with one embodiment of the present disclosure.

FIG. 2 is a flowchart representing a regenerative braking method in accordance with one embodiment of the present disclosure.

Referring to FIGS. 1 and 2, a coast regenerative torque may be generated due to tip-out of the accelerator pedal (operation S110).

The speed of the vehicle may be decreased depending on the coast regenerative torque, and thus a deceleration of the vehicle may be generated (operation S210). The deceleration of the vehicle may be determined by a value acquired by adding the coast regenerative torque to the total braking force of the vehicle If the driver depresses the brake pedal (the brake pedal is turned on), the sensor unit 100 may sense the on-state of the brake pedal and may transmit the sensed on-state of the brake pedal to the electronic posture controller 200. Further, the sensor unit 100 may transmit information, such as a vehicle speed, a wheel speed, a gear state, a pressure of the master cylinder, etc., to the electronic posture controller 200 (operations S120 and S130).

The regenerative braking determination unit 210 may determine that the vehicle satisfies the entry condition for regenerative braking, if the driver depresses the brake pedal. In other words, if the driver depresses the brake pedal, the regenerative braking method in accordance with the present disclosure may be implemented. Here, the regenerative braking determination unit 210 may determine whether or not the vehicle satisfies the entry condition for regenerative braking, based on information acquired by determining whether or not slip of the vehicle occurs (operation S140). In more detail, the regenerative braking determination unit 210 may determine that the vehicle does not satisfy the entry condition for regenerative braking, if slip of the vehicle occurs, and thus the regenerative braking system 1 may not perform regenerative braking (operation S145). The reason for such control is that it is important for vehicle control to ensure driver safety by maximally preventing slip of the vehicle rather than reducing fuel consumption through regenerative braking (operation S140).

The calculation unit 230 may require a maximum feasible regenerative braking amount/force transmitted by the controller 300 and a predetermined allowable regenerative braking torque, in addition to the pressure of the master cylinder, so as to calculate the target amount of the regenerative braking torque. The maximum feasible regenerative braking amount/force may be calculated based on a torque value acquired by the motor torque sensor 70 or may be calculated based on a feasible regenerative braking amount/force matching the corresponding torque value. The calculation unit 230 may set the upper limit of the regenerative braking torque within a range of the maximum feasible regenerative braking amount/force. In other words, the upper limit of the regenerative braking torque may mean a value which is calculated based on the torque value acquired by the motor torque sensor 70 (operation S220).

The calculation unit 230 may calculate a difference between the upper limit of the regenerative braking torque and the coast regenerative torque and may set the difference to the allowable regenerative braking torque. The allowable regenerative braking torque may mean a value which becomes a reference to calculate the target amount of the regenerative braking torque. In more detail, the allowable regenerative braking torque may mean a reference value to prevent the vehicle from excessively performing regenerative braking so as to secure stability and linearity of the vehicle (operation S150).

The calculation unit 230 may calculate the target amount of the regenerative braking torque and the total braking force of the vehicle. The calculation unit 230 may calculate the total braking force of the vehicle, i.e., the sum of the hydraulic braking torque according to the pressure of the master cylinder and the target amount of the regenerative braking torque. In other words, the calculation unit 230 does not determine a distribution ratio between the hydraulic braking force and the braking force for regenerative braking based on the total braking force of the vehicle, and may calculate the target amount of the regenerative braking torque which is varied according to the pressure of the master cylinder, in addition to the hydraulic braking force according to the pressure of the master cylinder (operations S160 and S220).

Thereafter, the controller 300 may perform regenerative braking based on the calculated target amount of the regenerative braking torque and the coast regenerative torque and may perform hydraulic braking (frictional braking) by controlling the hydraulic braking apparatus 400 depending on the pressure of the master cylinder. Actually, hydraulic braking may be performed at the moment when the driver applies pressure to the brake pedal. In other words, the controller 300 may perform hydraulic braking when the driver applies pressure to the brake pedal, and perform regenerative braking using the target amount of the regenerative braking torque calculated based on a change in the pressure of the master cylinder according to operation of the brake. In a situation in which regenerative braking caused by the coast regenerative torque is already being performed, regenerative braking depending on the target amount of the regenerative braking torque may be additionally performed (operations S170 and S230).

As regenerative braking and hydraulic braking are performed, a deceleration of the vehicle may be generated. The deceleration of the vehicle indicates a decrease in the speed of the vehicle within a fixed time. In accordance with one embodiment of the present disclosure, the deceleration of the vehicle may be generated depending on a value acquired by adding the coast regenerative torque to the total braking force of the vehicle (operation S300).

Figure 3:
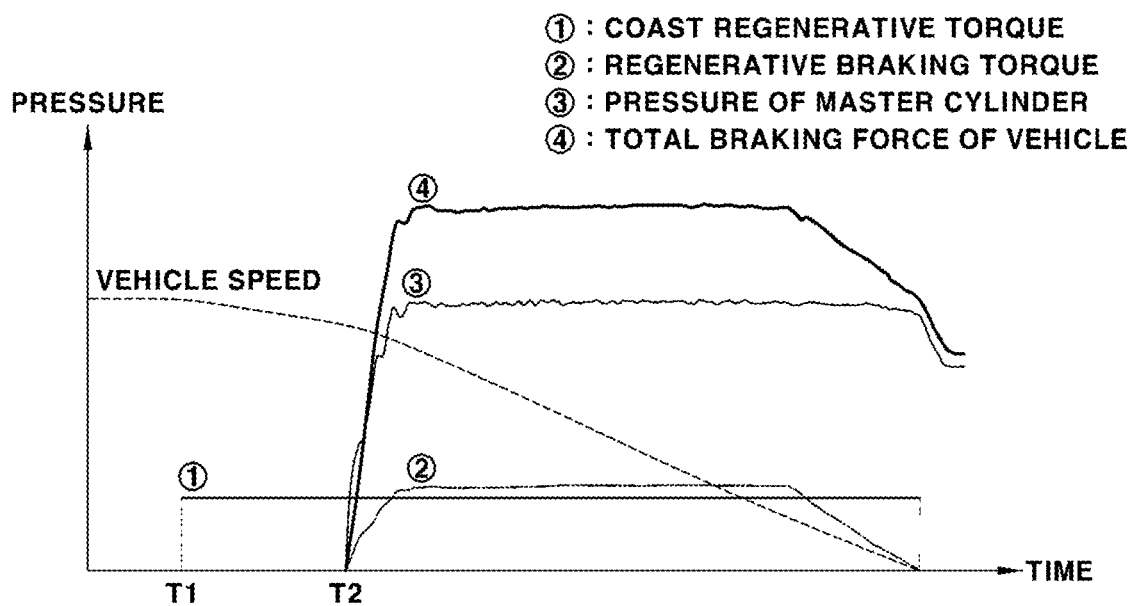
FIG. 3 is a graph representing a total braking force of a vehicle in accordance with one embodiment of the present disclosure.

FIG. 3 is a graph representing the total braking force of the vehicle in accordance with one embodiment of the present disclosure. In FIG. 3, a case in which the pressure applied to the brake pedal by the driver is uniformly maintained is described.

Referring to FIGS. 1 and 3, tip-out of the accelerator pedal may be generated at a first time T1. The coast regenerative torque may be generated due to the tip-out of the accelerator pedal. As the coast regenerative torque is generated, the speed of the vehicle which was coasting may be suddenly decreased.

The brake pedal may be turned on at a second time T2. In other words, the driver may depress the brake pedal at the second time T2. As the driver depresses the brake pedal, regenerative braking in accordance with the present disclosure may be performed. If the driver depresses the brake pedal, the regenerative braking determination unit 210 may determine that the vehicle satisfies the entry condition for regenerative braking.

As the driver depresses the brake pedal, the pressure of the master cylinder may be increased, and thus hydraulic braking torque (hydraulic braking force) may be generated. Further, within a certain section of the pressure of the master cylinder, as the pressure of the master cylinder is increased, the target amount of the regenerative braking torque may be increased. The total braking force of the vehicle may be calculated as the sum of the hydraulic braking torque and the target amount of the regenerative braking torque. Further, at a point in time when the regenerative braking torque becomes 0, the speed of the vehicle may converge on 0, and the value of the coast regeneration value may converge on 0.

In accordance with one embodiment of the present disclosure, the total braking force of the vehicle may be calculated as the sum of the hydraulic braking torque according to the pressure of the master cylinder and the regenerative braking torque. In other words, the regenerative braking system 1 does not control the vehicle in a manner in which, as the pressure of the master cylinder is increased, the regenerative braking torque is decreased so that the total braking force of the vehicle is uniformly maintained, and may control the vehicle such that, as the pressure of the master cylinder is increased within a designated section, the regenerative braking torque is increased. Therefore, the total braking force of the vehicle may be increased.

Further, even if regenerative braking depending on the target amount of the regenerative braking torque is performed, the pressure of the master cylinder may be maintained. In other words, the regenerative braking system 1 may not perform control in which a hydraulic pressure caused by the pressure of the master cylinder is decreased or increased. Therefore, linearity in braking according to the pressure of the brake pedal may be secured.

Figure 4:
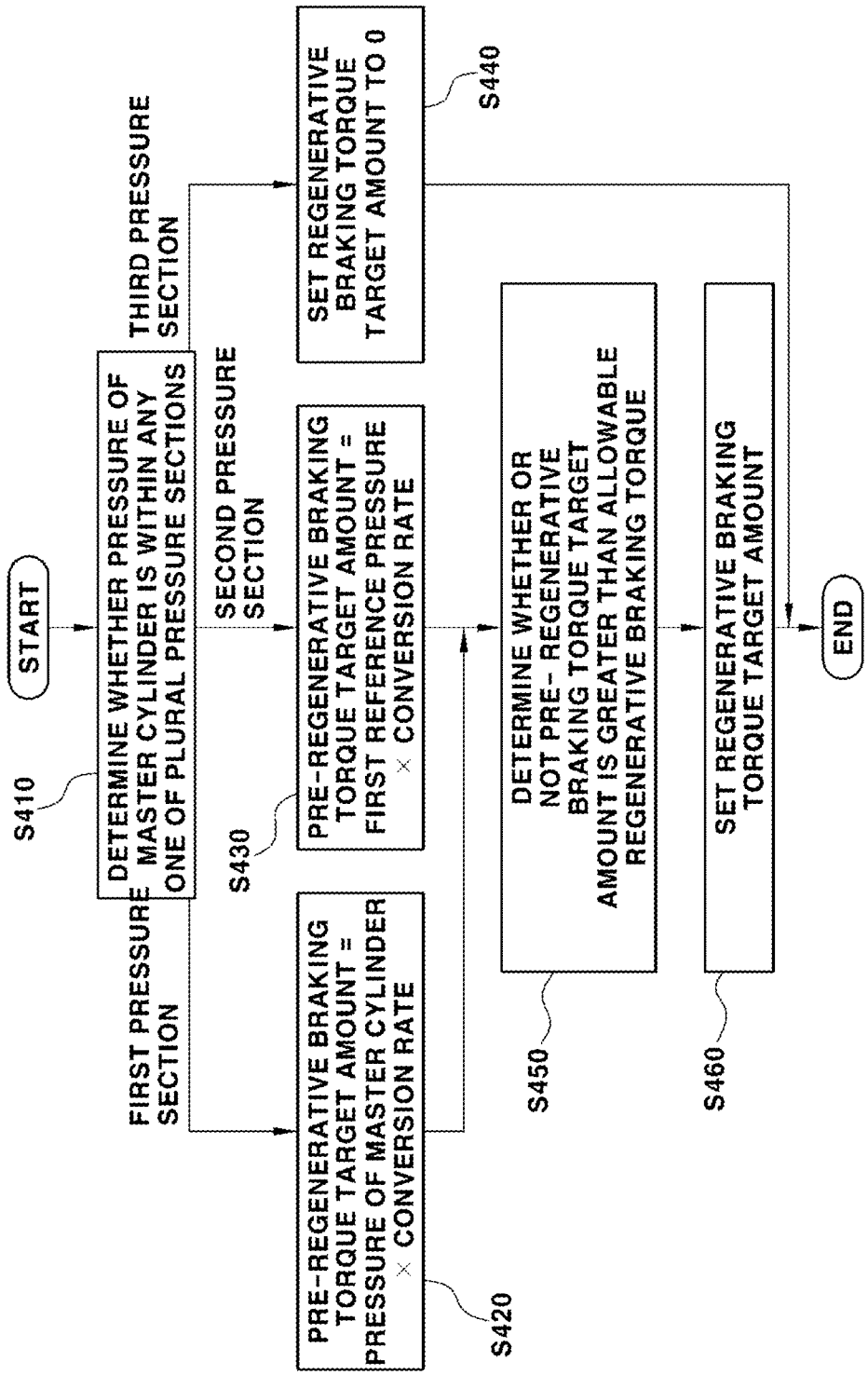
FIG. 4 is a flowchart representing a method for setting a target mount of regenerative braking torque in accordance with one embodiment of the present disclosure.
Figure 5:
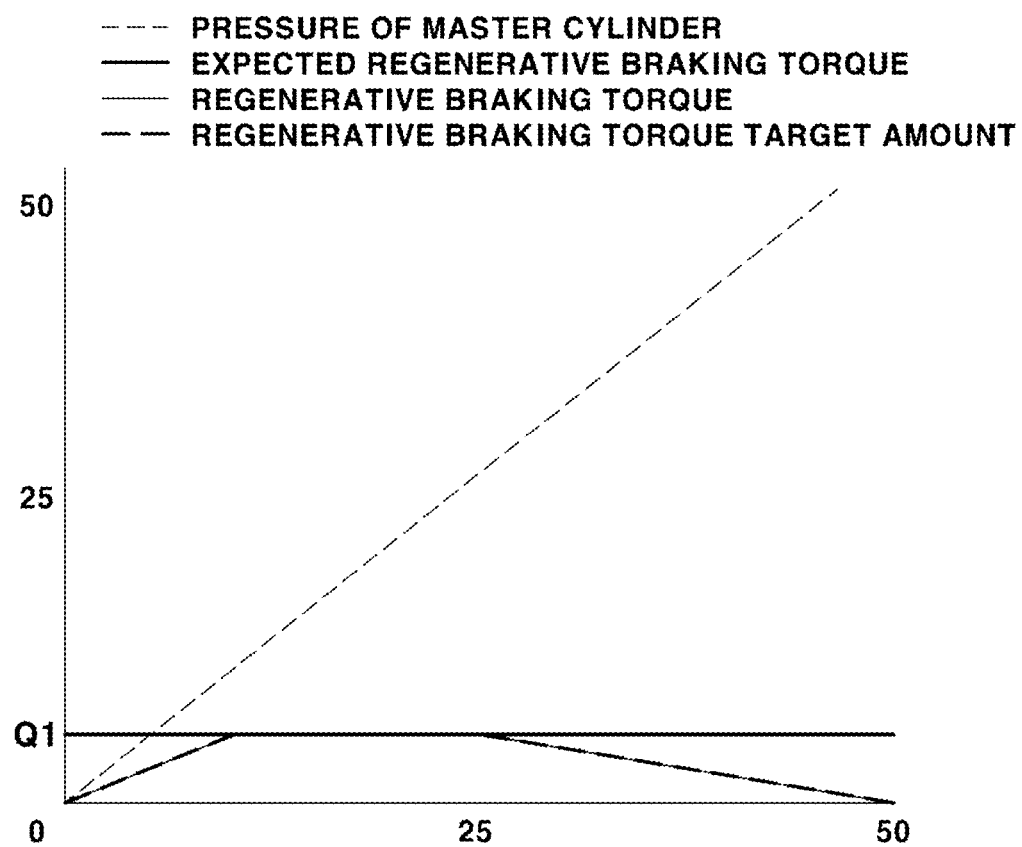
FIG. 5 is a graph representing the target amount of the regenerative braking torque in accordance with one embodiment of the present disclosure.

FIG. 4 is a flowchart representing a method for setting the target amount of the regenerative braking torque in accordance with one embodiment of the present disclosure, and FIG. 5 is a graph representing the target amount of the regenerative braking torque in accordance with one embodiment of the present disclosure. In FIG. 5, Q1 may be an allowable regenerative braking torque value.

Referring to FIGS. 1, 4 and 5, the calculation unit 230 may set the target amount of the regenerative braking torque. The controller 300 may calculate the upper limit of the regenerative braking torque based on a torque generated from the motor 500. The upper limit of the regenerative braking torque may mean the maximum value within limits within which vehicle stability is secured through evaluation of an actual vehicle, and the upper limit of the regenerative braking torque may be a value which is predetermined according to the torque generated from the motor 500. The calculation unit 230 may calculate a value acquired by subtracting the coast regenerative torque from the upper limit of the regenerative braking torque as the allowable regenerative braking torque Q1. The calculation unit 230 may set the target amount of the regenerative braking torque which does not exceed the allowable regenerative braking torque Q1. In other words, the calculation unit 230 may compare a target amount of a pre-regenerative braking torque, which is calculated according to the pressure of the master cylinder, with the allowable regenerative braking torque Q1. When the target amount of pre-regenerative braking torque is greater than the allowable regenerative braking torque Q1, the calculation unit 230 may set the allowable regenerative braking torque Q1 to the target amount of the regenerative braking torque. When the target amount of the pre-regenerative braking torque is less than the allowable regenerative braking torque Q1, the calculation unit 230 may set the target amount of the pre-regenerative braking torque to the target amount of the regenerative braking torque.

The calculation unit 230 may set a plurality of pressure sections of the master cylinder and may set the target amount of the regenerative braking torque based on whether the pressure of the master cylinder is within any one of the pressure section. For example, the calculation unit 230 may determine whether the pressure of the master cylinder acquired by the master cylinder pressure sensor 30 is within a first pressure section, a second pressure section or a third pressure section. The first pressure section may be a section in which pressure values are 0 or more and less than a first reference pressure, the second pressure section may be a section in which pressure values are the first reference pressure or more and less than a second reference pressure, and the third pressure section may be a section in which pressure values are the second reference pressure or more. The second reference pressure may be a pressure value which is greater than the first reference pressure. For example, the first reference pressure may be 25 bar, and the second reference pressure may be 50 bar. The number of the pressure sections may be set to be greater or less than three, and the values of the reference pressures may be changed by a designer (operation S410).

If the pressure of the master cylinder is within the first pressure section, the calculation unit 230 may set the target amount of the pre-regenerative braking torque to a value acquired by multiplying the pressure of the master cylinder by a conversion rate. The conversion rate may mean a factor to calculate the target amount of the regenerative braking torque applied to the vehicle in consideration of stability and linearity in braking of the vehicle. The conversion rate is applied to the target amount of the pre-regenerative braking torque and may thus prevent side effects of excessive regenerative braking on stability of the vehicle. For example, the conversion rate may be 0.5, but such a value may be changed by a designer. As one example, if the pressure of the master cylinder is 10 bar, the calculation unit 230 may set the target amount of the pre-regenerative braking torque to 5 bar acquired by multiplying the pressure of the master cylinder by 0.5. Here, when the allowable regenerative braking torque Q1 is 10 bar, the calculation unit 230 may set the target amount of the regenerative braking torque to 5 bar. As another example, if the pressure of the master cylinder is 24 bar, the calculation unit 230 may set the target amount of the pre-regenerative braking torque to 12 bar acquired by multiplying the pressure of the master cylinder by 0.5. Here, when the allowable regenerative braking torque Q1 is 10 bar, the calculation unit 230 may set the target amount of the regenerative braking torque to 10 bar (operations S420 and 450).

If the pressure of the master cylinder is within the second pressure section, the calculation unit 230 may set the target amount of the pre-regenerative braking torque to a value acquired by multiplying the first reference pressure by the conversion rate. For example, if the pressure of the master cylinder is 30 bar, the calculation unit 230 may set the target amount of the pre-regenerative braking torque to 12.5 bar acquired by multiplying the first reference pressure, i.e., 25 bar, by 0.5. Here, when the allowable regenerative braking torque Q1 is 10 bar, the calculation unit 230 may set the target amount of the regenerative braking torque to 10 bar. In other words, if the pressure of the master cylinder is within the second pressure section, the calculation unit 230 may set the target amount of the regenerative braking torque to the allowable regenerative braking torque Q1 without depending on the pressure of the master cylinder (operations S430 and S450).

If the pressure of the master cylinder is within the third pressure section, the calculation unit 230 may set the target amount of the regenerative braking torque as 0. A situation in which the pressure of the master cylinder is within the third pressure section may be a situation in which rapid braking of the vehicle is required. Therefore, the vehicle may be controlled such that emphasis is placed on braking of the vehicle rather than regenerative braking. In other words, if the pressure of the master cylinder is within the third pressure section, only regenerative braking caused by coast regenerative torque may be performed (operations S440 and S450).

The calculation unit 230 may employ different methods for determining the target amount of the regenerative braking torque according to whether the pressure of the master cylinder is within the first pressure section, the second pressure section or the third pressure section. Therefore, the calculation unit 230 may set the target amount of the regenerative braking torque which is varied depending on the pressure of the master cylinder (operation S460).

In accordance with one embodiment of the present disclosure, the regenerative braking system 1 may vary a regenerative braking force according to the pressure of the master cylinder. In other words, the calculation unit 230 may set the target amount of the regenerative braking torque to a large value when the pressure of the master cylinder is relatively small and may set the target amount of the regenerative braking torque to a small value when the pressure of the master cylinder is relatively great, based on the predetermined pressure sections. By such a method, as the pressure applied to the brake pedal by the driver is decreased, the regenerative braking system 1 may increase a regenerative braking torque so as to secure a braking force and may improve fuel efficiency of the vehicle due to securing of additional braking force.

Figure 6:
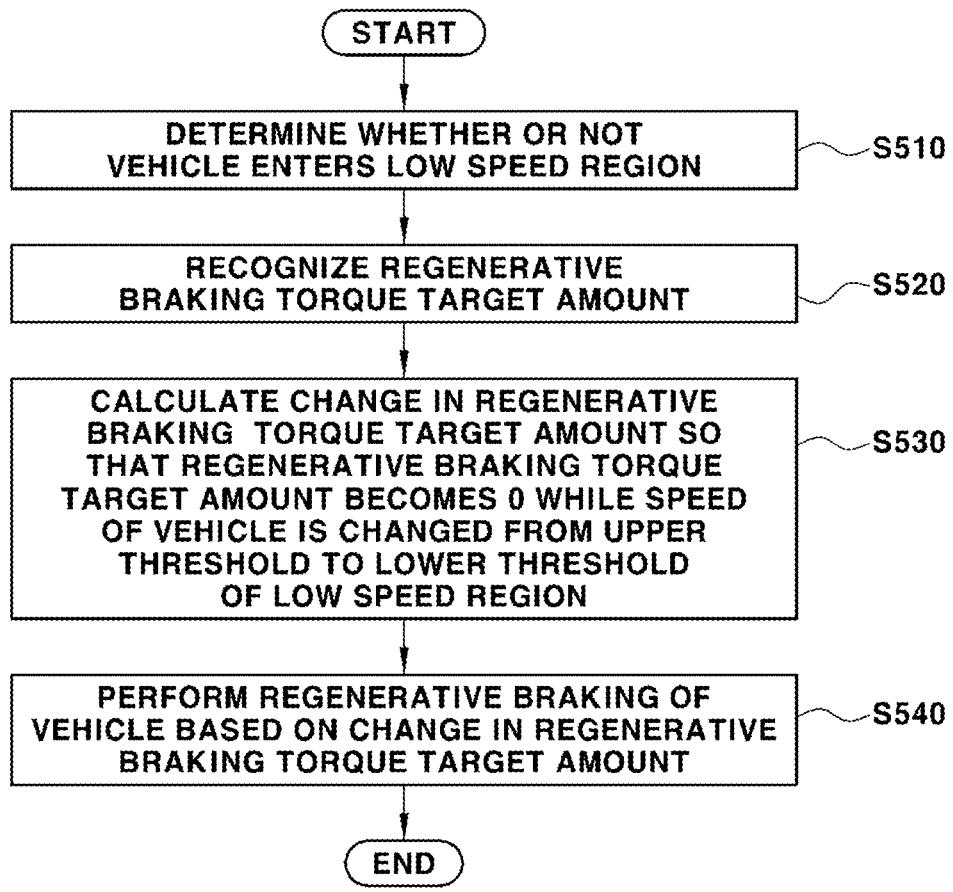
FIG. 6 is a flowchart representing a method for calculating a change in the target amount of the regenerative braking torque in a low speed region in accordance with one embodiment of the present disclosure.
Figure 7:
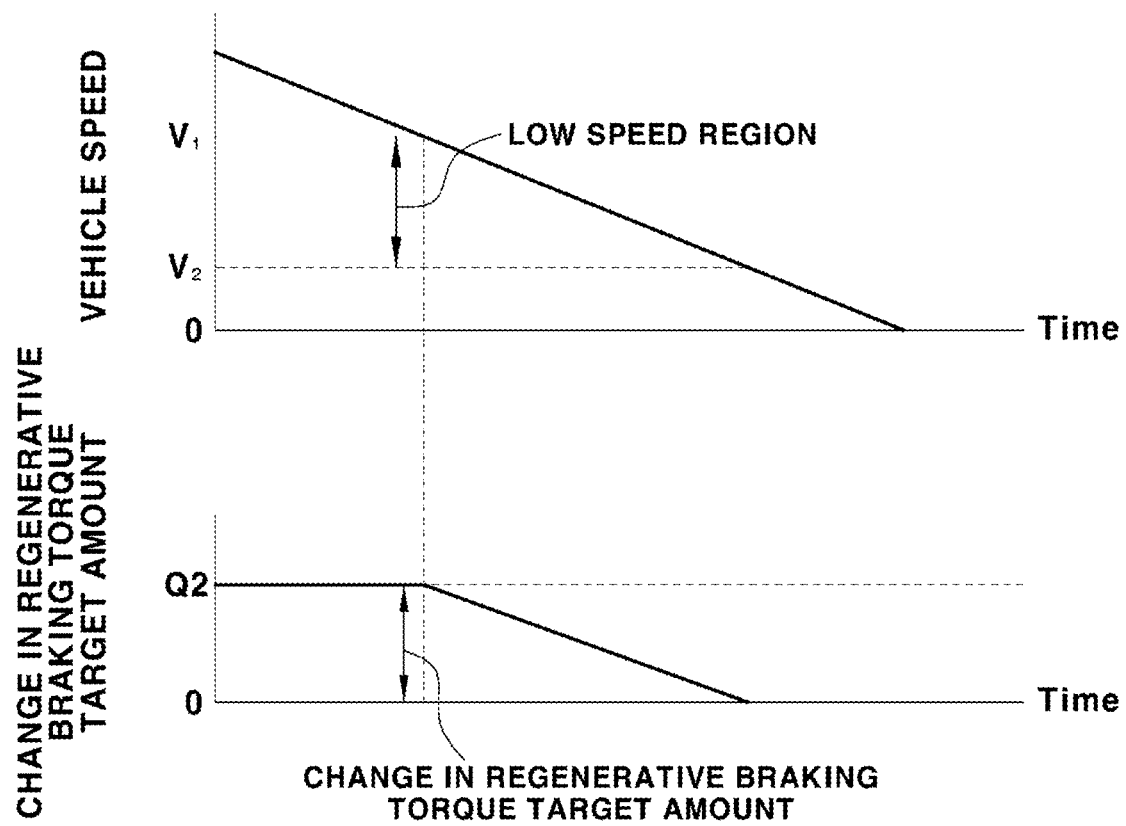
FIG. 7 is a graph representing the change in the target amount of the regenerative braking torque in the low speed region in accordance with one embodiment of the present disclosure.

FIG. 6 is a flowchart representing a method for calculating a change in the target amount of the regenerative braking torque in a low speed region in accordance with one embodiment of the present disclosure, and FIG. 7 is a graph representing the change in the target amount of the regenerative braking torque in the low speed region in accordance with one embodiment of the present disclosure.

Referring to FIGS. 1, 6 and 7, if the vehicle enters a low speed region, the regenerative braking system 1 may decrease the target amount of the regenerative braking torque applied to the motor 500. The low speed region may be a predetermined region. For example, the upper threshold V1 of the low speed region may be 3 kph, and the lower threshold V2 of the low speed region may be 1 kph.

The wheel speed sensor 10 may determine whether or not the vehicle enters the low speed region. Information sensed by the wheel speed sensor 10 may be transmitted to the electronic posture controller 200 (operation S510).

When the vehicle enters the low speed region, the calculation unit 230 may recognize a current target amount Q2 of the regenerative braking torque (operation S520).

The calculation unit 230 may calculate a change in the target amount of the regenerative braking torque so that the target amount Q2 of the regenerative braking torque becomes 0 until the speed of the vehicle reach the lower threshold V2 from the upper threshold V1 of the low speed region. When the vehicle enters the low speed region, the regenerative braking system 1 may decrease a braking force caused by regenerative braking so as to achieve smooth braking of the vehicle. For example, if the target amount Q2 of the regenerative braking torque is 10 bar, the calculation unit 230 may calculate a change in the target amount of the regenerative braking torque so as to control the vehicle. Thus, the speed of the vehicle is changed from 3 kph to 1 kph when the target amount Q2 of the regenerative braking torque is changed from 10 bar to 0 bar (operation S530).

The controller 300 may perform regenerative braking of the vehicle based on the change in the target amount of the regenerative braking torque calculated by the calculation unit 230 (operation S540). Here, at the moment when the vehicle reaches the lower threshold V2 of the low speed region, a regenerative braking torque applied to the motor 500 may become 0.

In accordance with one embodiment of the present disclosure, if the vehicle enters the low speed region, the regenerative braking system 1 may decrease the braking force caused by regenerative braking so as to achieve smooth braking of the vehicle.

As apparent from the above description, a regenerative braking system in accordance with one embodiment of the present disclosure may simultaneously perform hydraulic braking and regenerative braking. In other words, the regenerative braking system may maintain hydraulic pressure depending on the pressure of a master cylinder even if braking of a vehicle according to a target amount of a regenerative braking torque is performed.

Further, the regenerative braking system in accordance with one embodiment of the present disclosure may perform regenerative braking without any durability problems even if a low-price electronic stability control (ESC) model is applied thereto, and thus cost to implement the corresponding system may be reduced. Further, the regenerative braking system maintains the hydraulic pressure of the master cylinder, and thus does not cause problems, such as turning-off of a pedal or difficulty in maintaining linearity in braking.

The regenerative braking system in accordance with one embodiment of the present disclosure may vary a regenerative braking force according to the pressure of the master cylinder. By such a system, even if the pressure applied to the brake pedal by the driver is decreased, the regenerative braking system may increase a regenerative braking torque so as to secure a braking force and may improve fuel efficiency of the vehicle due to securing of additional braking force.

The regenerative braking system in accordance with one embodiment of the present disclosure may decrease, if the vehicle enters a low speed region, the braking force caused by regenerative braking so as to achieve smooth braking of the vehicle.

The present disclosure has been described in detail with reference to specific embodiments thereof. However, it should be appreciated by those having ordinary skill in the art that changes may be made in these embodiments without departing from the principles and spirit of the present disclosure, the scope of which is defined in the appended claims and their equivalents.

What is claimed is:

1. A regenerative braking system comprising a controller configured to:
   determine whether or not a vehicle satisfies an entry condition for regenerative braking based on information collected by the vehicle;
   calculate a hydraulic braking torque according to a pressure of a master cylinder and a target amount of a regenerative braking torque varied according to the pressure of the master cylinder, if the vehicle satisfies the entry condition; and
   perform braking of the vehicle based on the target amount of the regenerative braking torque and the hydraulic braking torque,
   wherein the target amount of the regenerative braking torque is calculated using an upper limit of the regenerative braking torque calculated by the controller, a coast regenerative torque when an accelerator pedal of the vehicle is released, and the pressure of the master cylinder.

2. The regenerative braking system of claim 1, wherein the braking of the vehicle is performed based on a coast regenerative torque generated from a motor at a moment when tip-out caused by release of an accelerator pedal of the vehicle occurs.

3. The regenerative braking system of claim 2, wherein:
   a deceleration of the vehicle is generated by a sum of a total braking force and the coast regenerative torque; and
   the total braking force is defined by a sum of the target amount of the regenerative braking torque and the hydraulic braking torque.

4. The regenerative braking system of claim 1, wherein the information collected by the vehicle comprises at least one of an anti-lock braking system (ABS) state signal, a traction control system (TCS) state signal, a vehicle dynamic control (VDC) state signal, a vehicle speed, a wheel speed, a gear state, or the pressure of the master cylinder.

5. The regenerative braking system of claim 4, wherein:
   the entry condition includes a case in which the pressure of the master cylinder is sensed; and
   the controller determines that the vehicle does not satisfy the entry condition, if slip of the vehicle occurs, a gear is in neutral, a defect of a motor of the vehicle is sensed, or a defect of an ABS of the vehicle is sensed.

6. The regenerative braking system of claim 1, wherein the controller monitors the coast regenerative torque in real time so as to calculate the target amount of the regenerative braking torque.

7. The regenerative braking system of claim 1, wherein the controller:
   sets a difference between the upper limit of the regenerative braking torque and the coast regenerative torque as an allowable regenerative braking torque; and
   compares a target amount of a pre-regenerative braking torque, calculated according to the pressure of the master cylinder, with the allowable regenerative braking torque, and sets the allowable regenerative braking torque as the target amount of the regenerative braking torque when the target amount of the pre-regenerative braking torque is greater than the allowable regenerative braking torque.

8. The regenerative braking system of claim 1, wherein the controller sets a plurality of pressure sections of the master cylinder and sets the target amount of the regenerative braking torque based on whether the pressure of the master cylinder is within any one of the pressure sections.

9. The regenerative braking system of claim 8, wherein:
   the controller sets the target amount of the pre-regenerative braking torque as a value acquired by multiplying the pressure of the master cylinder by a conversion rate, if the pressure of the master cylinder is less than a first reference pressure; and
   the controller sets the target amount of the pre-regenerative braking torque as a value acquired by multiplying the first reference pressure by the conversion rate, if the pressure of the master cylinder is the first reference pressure or more and less than a second reference pressure.

10. The regenerative braking system of claim 1, wherein, when the vehicle enters a low speed region:
    the controller calculates a change in the target amount of the regenerative braking torque so that the target amount of the regenerative braking torque becomes 0 when a speed of the vehicle reaches a lower threshold from an upper threshold of the low speed region; and
    the controller performs regenerative braking of the vehicle according to the change in the target amount of the regenerative braking torque calculated by the controller.

11. The regenerative braking system of claim 7, wherein the controller sets the target amount of the regenerative braking torque as 0, if the pressure of the master cylinder is a second reference pressure or more.

12. The regenerative braking system of claim 1, wherein the controller maintains a hydraulic pressure caused by the pressure of the master cylinder, even if braking of the vehicle according to the target amount of the regenerative braking torque is performed.

13. A regenerative braking method comprising:
    decelerating, by a controller, a vehicle based on a coast regenerative torque generated from a motor at a moment when tip-out caused by release of an accelerator pedal of the vehicle occurs;
    determining, by the controller, whether or not the vehicle satisfies an entry condition for regenerative braking based on information collected by the vehicle;

calculating, by the controller, a hydraulic braking torque according to a pressure of a master cylinder and a target amount of a regenerative braking torque varied according to the pressure of the master cylinder, if the vehicle satisfies the entry condition; and performing, by the controller, braking of the vehicle based on the target amount of the regenerative braking torque and the hydraulic braking torque, wherein the target amount of the regenerative braking torque is calculated using an upper limit of the regenerative braking torque calculated by the controller, a coast regenerative torque when an accelerator pedal of the vehicle is released, and the pressure of the master cylinder.

14. The regenerative braking method according to claim 13, wherein the determination as to whether or not the vehicle satisfies the entry condition comprises:

determining that the vehicle does not satisfy the entry condition, if slip of the vehicle occurs, a gear is in neutral, or a defect of the motor of the vehicle is sensed.

15. The regenerative braking method according to claim 13, wherein the calculation of the target amount of the regenerative braking torque comprises:

determining an upper limit of the regenerative braking torque based on a torque output from the motor;

setting a difference between the upper limit of the regenerative braking torque and the coast regenerative torque as an allowable regenerative braking torque;

comparing a target amount of a pre-regenerative braking torque, calculated according to the pressure of the master cylinder, with the allowable regenerative braking torque; and setting the allowable regenerative braking torque as the target amount of the regenerative braking torque when the target amount of the pre-regenerative braking torque is greater than the allowable regenerative braking torque.

16. The regenerative braking method according to claim 15, wherein the calculation of the target amount of the pre-regenerative braking torque further comprises:

setting the target amount of the pre-regenerative braking torque as a value acquired by multiplying the pressure of the master cylinder by a conversion rate, if the pressure of the master cylinder is less than a first reference pressure.

17. The regenerative braking method according to claim 13, wherein the calculation of the target amount of the regenerative braking torque comprises:

when the vehicle enters a low speed region during regenerative braking of the vehicle, calculating a change in the target amount of the regenerative braking torque so that the target amount of the regenerative braking torque becomes 0 until a speed of the vehicle reaches a lower threshold from an upper threshold of the low speed region.

18. The regenerative braking method according to claim 15, wherein the calculation of the target amount of the pre-regenerative braking torque further comprises:

setting the target amount of the pre-regenerative braking torque to a value acquired by multiplying a first reference pressure by a conversion rate, if the pressure of the master cylinder is the first reference pressure or more and less than a second reference pressure.

19. The regenerative braking method according to claim 13, wherein the calculation of the target amount of the regenerative braking torque further comprises:

setting, by the controller, the target amount of the regenerative braking torque as 0, if the pressure of the master cylinder is a second reference pressure or more.

* * * * *